(12) United States Patent
Julien et al.

(10) Patent No.: US 8,284,771 B1
(45) Date of Patent: Oct. 9, 2012

(54) RUN-TIME SCALABLE SWITCH FABRIC

(75) Inventors: Martin Julien, Laval (CA); Robert Brunner, Montreal (CA); Stéphane Lessard, Mirabel (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 35 days.

(21) Appl. No.: 13/103,040

(22) Filed: May 6, 2011

(51) Int. Cl.
  *H04L 12/52* (2006.01)

(52) U.S. Cl. ........ 370/387; 370/401; 370/386; 370/388; 370/389

(58) Field of Classification Search .......................... None
See application file for complete search history.

(56) References Cited

U.S. PATENT DOCUMENTS

| | | | |
|---|---|---|---|
| 6,829,405 B1 * | 12/2004 | Wachsman et al. ............. | 385/24 |
| 7,149,996 B1 * | 12/2006 | Lysaght et al. .................. | 326/38 |
| 7,161,906 B2 * | 1/2007 | Dell et al. ...................... | 370/231 |
| 2007/0200594 A1 * | 8/2007 | Levi et al. ....................... | 326/38 |

* cited by examiner

*Primary Examiner* — Duc C Ho

(74) *Attorney, Agent, or Firm* — Jean-Pierre Fortin; Ericsson Canada Inc.

(57) ABSTRACT

Systems and methods according to these exemplary embodiments provide for dynamically scalable switching fabrics. A dynamically scalable switching fabric can include a first set of fabric element (FE) interfaces and a second set of FE interfaces, interconnectable by a reconfigurable crossbar. By selectively populating the FE interfaces, different switching capabilities, e.g., bandwidth per processor blade and/or number of processor blades supported, can be achieved. When the population of the FE interfaces is modified, the reconfigurable crossbar can reconfigure the links between FEs. According to one embodiment, a three-stage CLOS architecture can be implemented. According to another embodiment, a multi-plane architecture can be implemented.

17 Claims, 10 Drawing Sheets

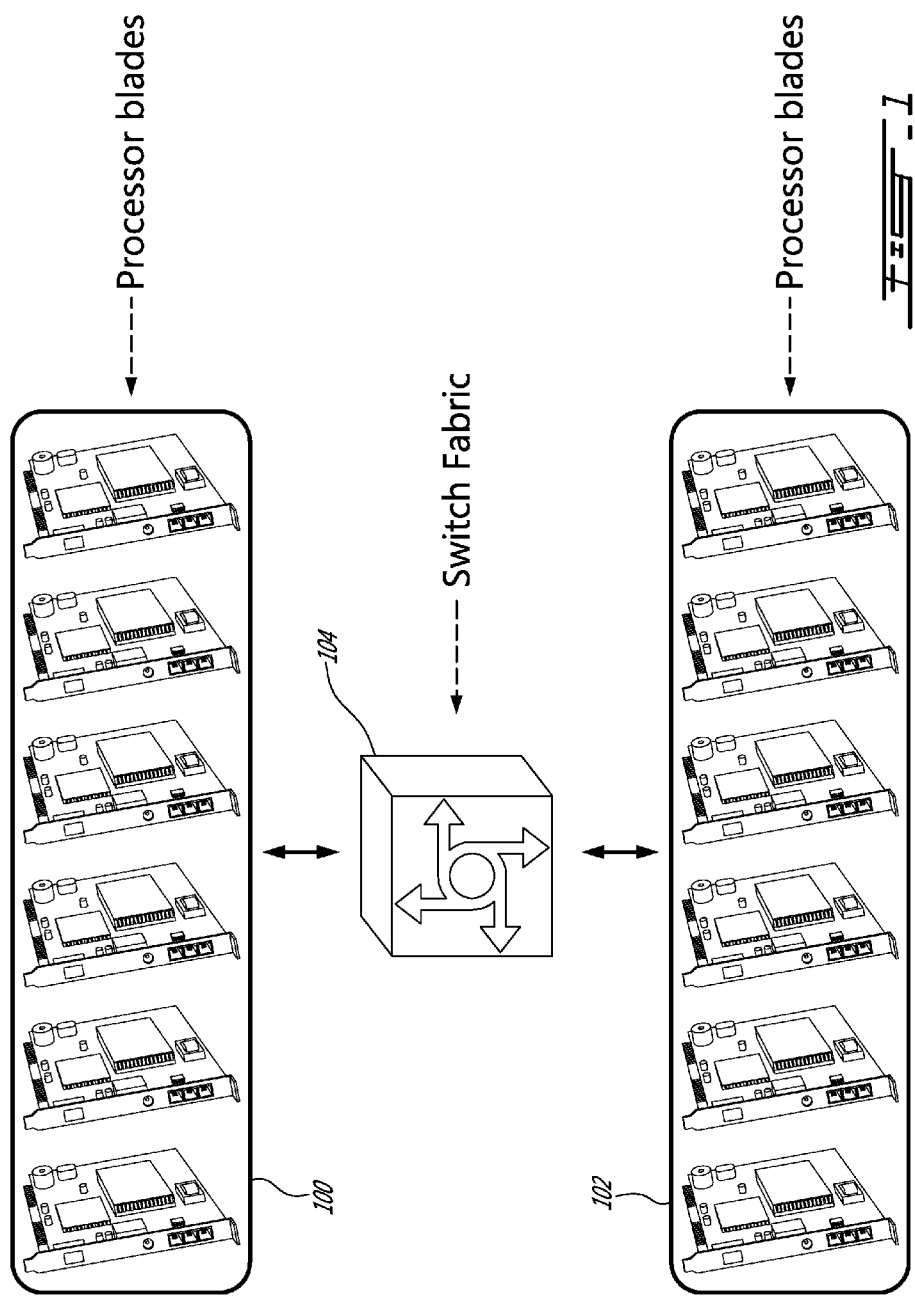

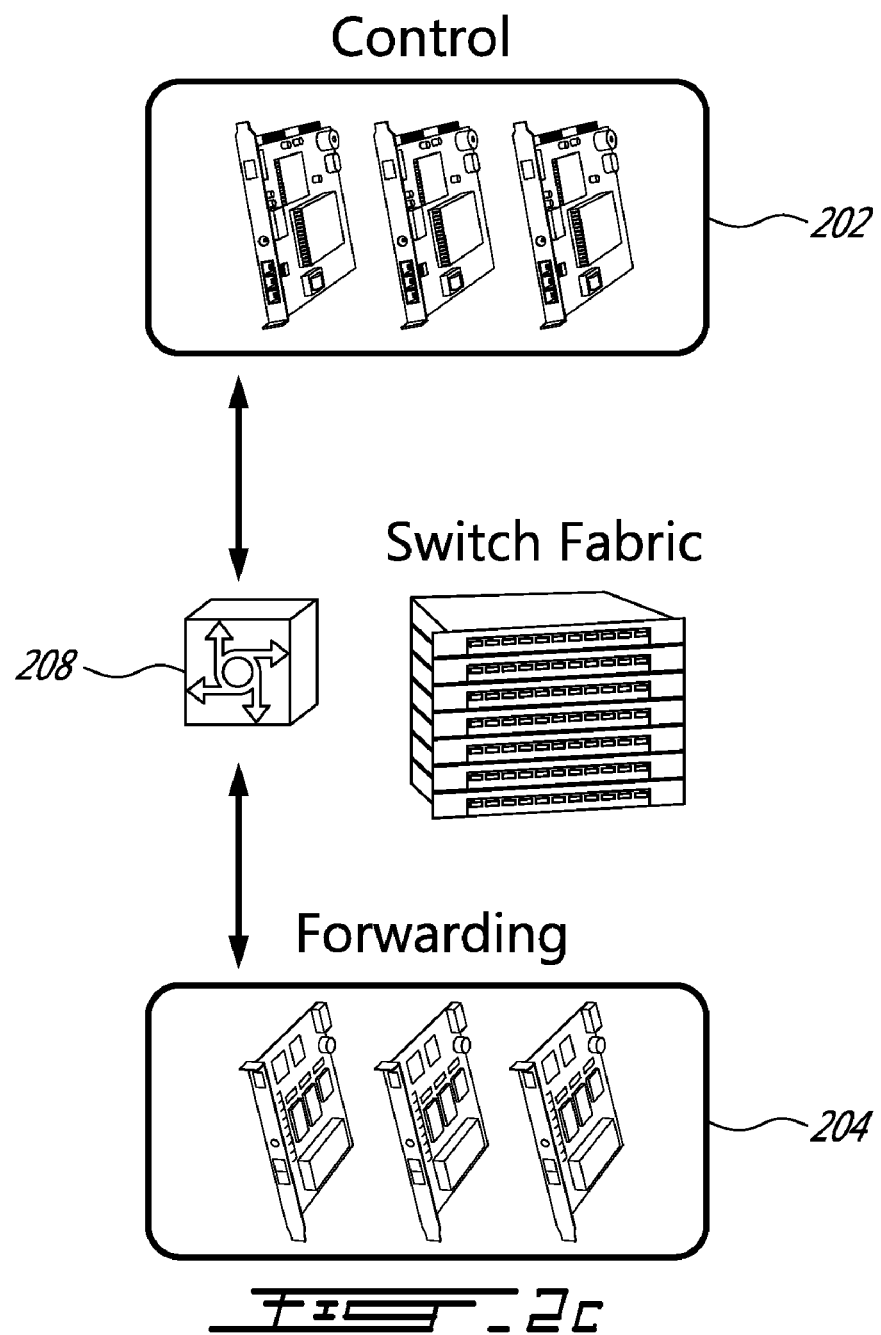

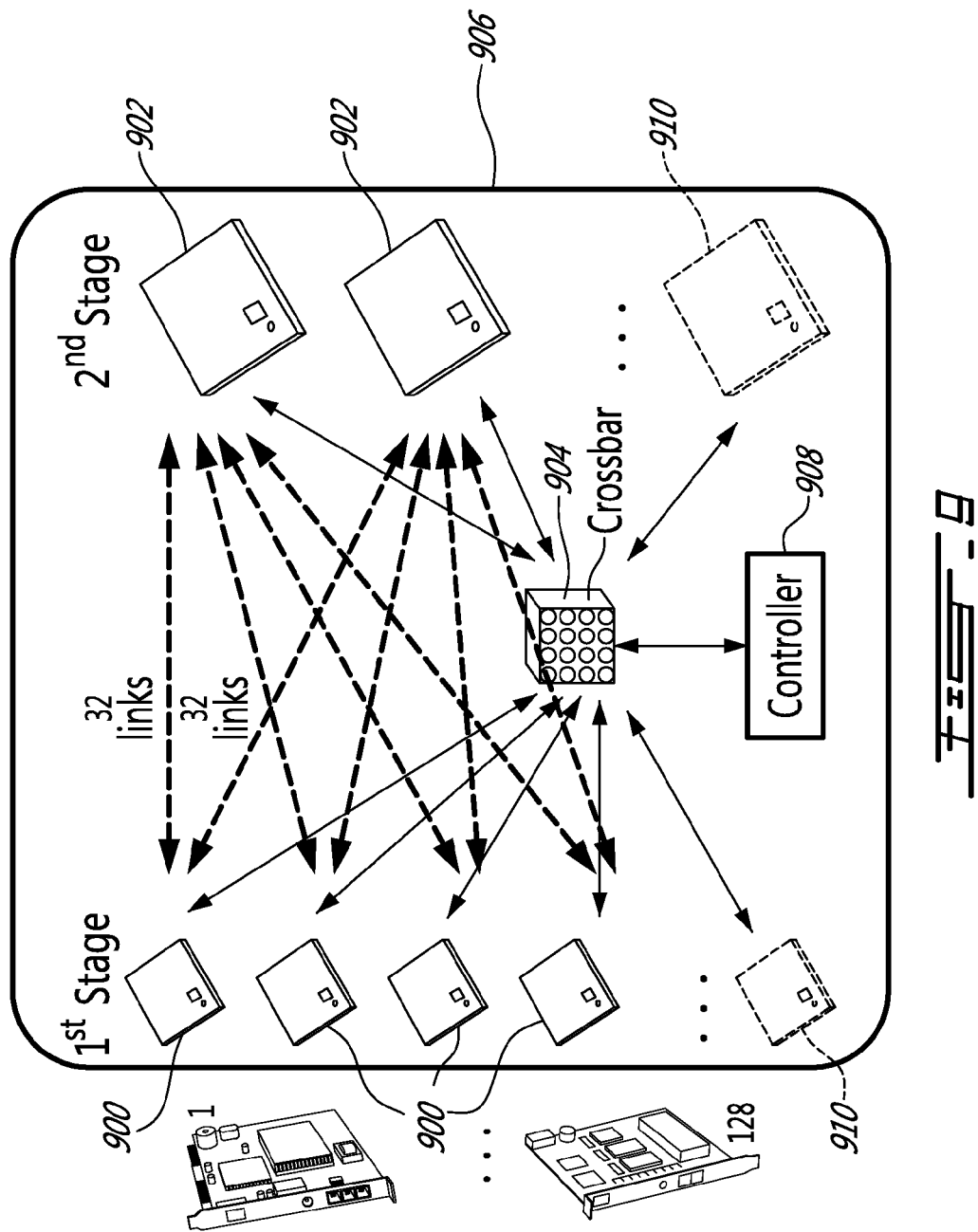

RUN-TIME SCALABLE SWITCH FABRIC

TECHNICAL FIELD

The present invention relates generally to telecommunications systems and in particular to switches and associated methods.

BACKGROUND

In the context of networking systems, such as IP routers and gateways, these systems are typically required to process an increasingly large amount of packets. This means that systems and system designers are typically required to find ways to provide more and more processing and bandwidth capacities. As the networking growth typically occurs over a long period of time, equipment vendors could offer different equipment based on capacity requirements, could offer an over engineered system, or could offer a more elegant way of scaling a system in order to sustain the increasing processing capacity requirements of the system operators.

It is typical to build large systems based on small components which are efficiently interconnected. For example, a system could be built using a blade form-factor, where each processor blade could provide a certain processing and bandwidth capacity. By interconnecting all the processor blades, it becomes possible to distribute the work load between the different processor blades, which could make the overall system a very high capacity system. Assuming that processor blades could be added or removed based on the processing capacity requirements of the system, a certain level of system scalability would be possible.

In order to interconnect a number of processor blades, a switch is typically required to exchange information between the blades. Depending on the required system characteristics, different switch fabric solutions could be used. While there are several standard-based solutions commercially available, there are also several proprietary solutions offering very advanced capabilities with regards to packet forwarding between a system's components.

While system scalability is typically provided by allowing more or fewer processor blades to be added to or removed from a system, it is not typical to allow this kind of scalability for the switch fabric. The switch fabric is normally designed on a system basis, assuming the maximum expected processing and bandwidth capacity requirements. For example, if a system would be designed to support a maximum of 128 processor blades, even though the system would only initially require 10 processor blades to be used to fulfill its processing capacity requirements, the switch fabric would typically still integrate all the hardware required for a 128-blade system, not only for a 10-blade system.

Since systems are typically scaled on a per blade-basis, because blades are normally designed with copper-based interconnections, because switch fabric solutions are typically designed to work based on the assumption that the maximum bandwidth capacity of a system might be required at any time, and because systems typically allow for a relatively limited number of interconnected processor blades, highly scalable switch fabric solutions with non-blocking characteristics are typically extremely challenging. While proprietary solutions could be developed to provide a highly scalable switch fabric, there is a need for simple solutions based on commercially available switch chipsets and protocols for providing a cost effective solution.

SUMMARY

Systems and methods according to these exemplary embodiments provide for dynamically scalable switches or switching fabrics. A dynamically scalable switching fabric can include a first set of fabric element (FE) interfaces and a second set of FE interfaces, which are interconnectable by a reconfigurable crossbar. By selectively populating the FE interfaces, different switching capabilities, e.g., bandwidth per processor blade and/or number of processor blades supported, can be achieved. When the population of the FE interfaces is modified, the reconfigurable crossbar can reconfigure the links between FEs. According to one embodiment, a three-stage CLOS architecture can be implemented. According to another embodiment, a multi-plane architecture can be implemented.

According to an embodiment, a dynamically scalable switching fabric includes N first switch fabric element (FE) interfaces, each of which is configured to be able to receive a first FE in a manner which enables the first FE to route data packets from a first input port of the first FE to a first output port of the first FE, wherein from 1 to N of the N first switch fabric element interfaces are populated with a respective first FE, M second switch FE interfaces, each of which is configured to receive a second FE in a manner which enables the second FE to route data packets from a second input port of the second FE to a second output port of the second FE, wherein from zero to M of the M second FE interfaces are populated with a respective second FE, and a reconfigurable crossbar element, connected to the N first switch FE interfaces and to the M second switch FEs, which reconfigurable crossbar element is configurable to interconnect populated first and second FE interfaces.

According to another embodiment, a method for manufacturing a dynamically scalable switching fabric includes the steps of providing N first switch fabric element (FE) interfaces, each of which is configured to be able to receive a first FE in a manner which enables the first FE to route data packets from a first input port of the first FE to a first output port of the first FE, wherein from 1 to N of the N first switch fabric element interfaces are populated with a respective first FE, providing M second switch FE interfaces, each of which is configured to receive a second FE in a manner which enables the second FE to route data packets from a second input port of the second FE to a second output port of the second FE, wherein from zero to M of the M second FE interfaces are populated with a respective second FE, and providing a reconfigurable crossbar element, connected to the plurality of N first switch FE interfaces and to the plurality of M second switch FEs, which reconfigurable crossbar element is configurable to interconnect populated first and second FE interfaces.

According to yet another embodiment, a dynamically scalable processing system includes a plurality of blade processors, a switch having: N first switch fabric element (FE) interfaces, each of which is configured to be able to receive a first FE in a manner which enables the first FE to route data packets from a first input port of the first FE to a first output port of the first FE, wherein from 1 to N of the N first switch fabric element interfaces are populated with a respective first FE, M second switch FE interfaces, each of which is configured to receive a second FE in a manner which enables the second FE to route data packets from a second input port of the second FE to a second output port of the second FE, wherein from zero to M of the M second FE interfaces are populated with a respective second FE, and a reconfigurable crossbar element, connected to the N first switch FE interfaces and to the M second switch FEs, which reconfigurable crossbar element is configurable to interconnect populated first and second FE interfaces, wherein the processor blades are each connected to each of the populated first FE interfaces.

BRIEF DESCRIPTION OF THE DRAWINGS

The accompanying drawings illustrate exemplary embodiments, wherein:

FIG. 1 shows a switch fabric interconnecting processor blades;

FIGS. 2(a)-2(c) illustrates various switch fabric form factors interconnecting control and forwarding processor blades;

FIG. 9 shows a dynamically scalable switch including a controller and empty interfaces according to an exemplary embodiment.

ABBREVIATIONS/ACRONYMS

Figure 2B:
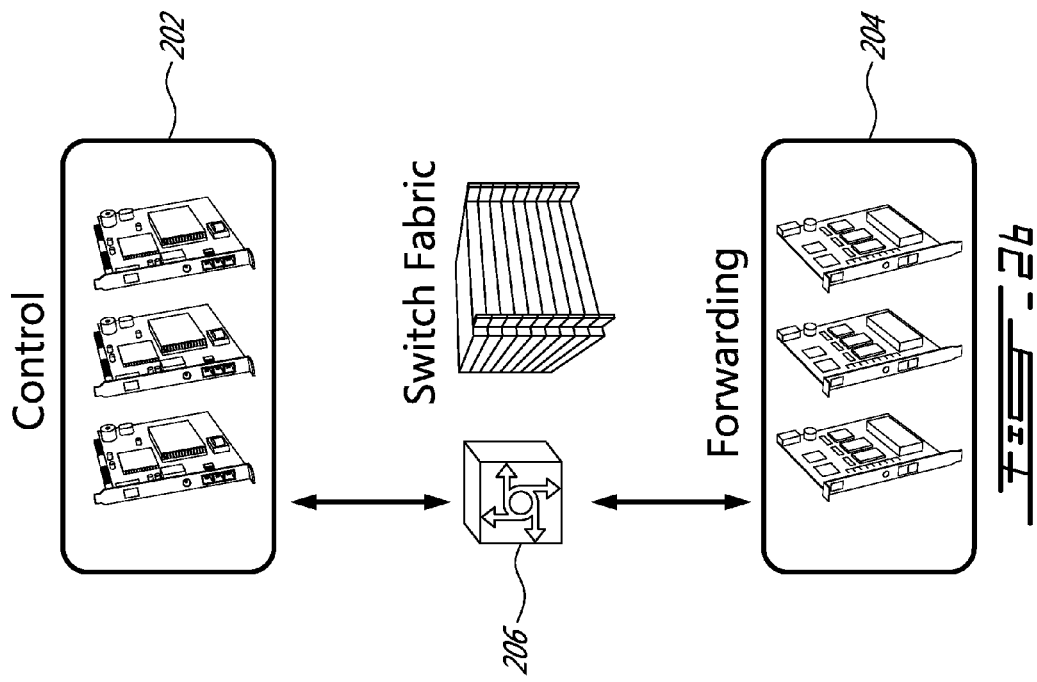

| ABBREVIATIONS/ACRONYMS | |
|---|---|
| FE | Fabric Element |
| Gbps | Gigabits per second |
| I/O | Input/Output |
| IP | Internet Protocol |
| MAC | Media Access Control |
| OXC | Optical Cross-Connect |
| PCB | Printed Circuit Board |

DETAILED DESCRIPTION

The following detailed description of the exemplary embodiments refers to the accompanying drawings. The same reference numbers in different drawings identify the same or similar elements. Also, the following detailed description does not limit the invention. Instead, the scope of the invention is defined by the appended claims.

According to exemplary embodiments, a dynamically scalable switch fabric includes a plurality of switch fabric element interfaces which can be populated with any desired number of switch fabric elements (FEs). As more or fewer FEs are added to or removed from the switch fabric dynamically, a reconfigurable crossbar device makes the required interconnections between the FEs as required by a desired switching configuration. By using a reconfigurable crossbar device to interconnect the FEs, the interconnect topologies of the links between the different FEs can be dynamically changed. An electrical or an optical crossbar can be used in such embodiments.

Prior to discussing dynamically scalable switch fabrics according to these embodiments, a general discussion of switch fabrics is provided for context. In the context of networking systems, requirements related to performance, bandwidth, energy efficiency, scalability and resiliency are a few examples of aspects which are important to consider in the design of such systems. As such systems are meant to scale and provide high processing and bandwidth capacities, a certain degree of flexibility needs to be provided in order to enable combining the capabilities of several small components in order to build a much more powerful, combined system. For example, a system using a single processor blade would naturally be limited by the performance characteristics of that single blade. However, by interconnecting multiple processor blades together, a system could be designed so that the processing tasks can be distributed among several processor blades.

A switch fabric is a networking device that enables several processor blades to be interconnected together in order to exchange information. For example, depending on the characteristics of the switch fabric, the communication between the different processor blades could be reliable, high-speed, resilient, non-blocking, etc. In the context of this discussion, a highly scalable and energy efficient switch fabric architecture is particularly of interest.

As shown in FIG. 1, different sets of processor blades 100 and 102 are interconnected to a central switch fabric 104, which is responsible for forwarding packets between the processor blades. The terms "switch fabric" and "switch" are used interchangeably herein. As suggested by the name, a switch 104 can be used to switch packets between different nodes connected to it. The switching decision is typically based on the content of each packet. Depending on the technology used by the switch fabric 104, different protocols could be required for switching packets between the processor blades 100, 102. For example, the IEEE's Ethernet protocol standard could be used in order to build a switch fabric 104. In fact, the Ethernet protocol clearly specifies the addressing scheme and the expected behavior related to an Ethernet-based switch.

Figure 2A:
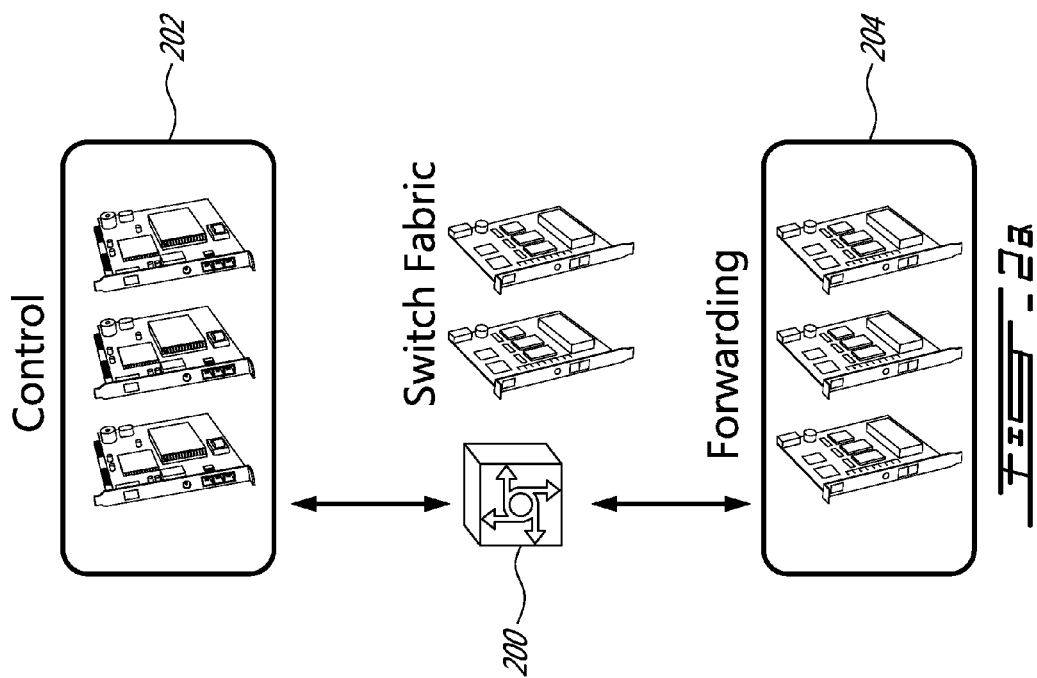

Depending on system requirements and expected switching characteristics, several different form-factors could be used to build a switch fabric 104. For example, as shown in FIG. 2(a), a switch fabric 200 can be built, for example, based on a blade design form-factor. FIG. 2(a) shows control blades 202 and forwarding blade blades 204, which are blade types typically found in IP router systems. While a blade design form factor for a switching fabric can be used to readily integrate the switch blades in a chassis which is potentially shared with processor blades, other form-factors can be used for switches having a chassis which is independent of the processor blades. For example, as shown in FIG. 2(b), a switch fabric 206 can be provided as a centralized single-box design form-factor or, as shown in FIG. 2(c) a switch fabric 208 can be provided as an arrangement of multiple single-box design form-factors.

According to exemplary embodiments, it is desirable to design a switch fabric 104 having high scalability and energy efficiency characteristics and, accordingly, different switch architecture design options are considered below. In the context of these embodiments, a Fabric Element (FE) refers to a type of processor which provides the switching functions necessary to exchange packets or frames between different nodes which are connected to the FE, e.g., different processor blades. Based on the content and the configuration of the FE, it is possible to switch a frame received on an input port to an output port of the FE. An FE may have a number of input and output ports. As an illustrative example, an Ethernet switch chipset is a type of FE and, currently, there are several vendors offering Ethernet switch chipsets with up to 128 ports, each port capable of supporting bitrates of at least 10 Gbps.

Figure 3:
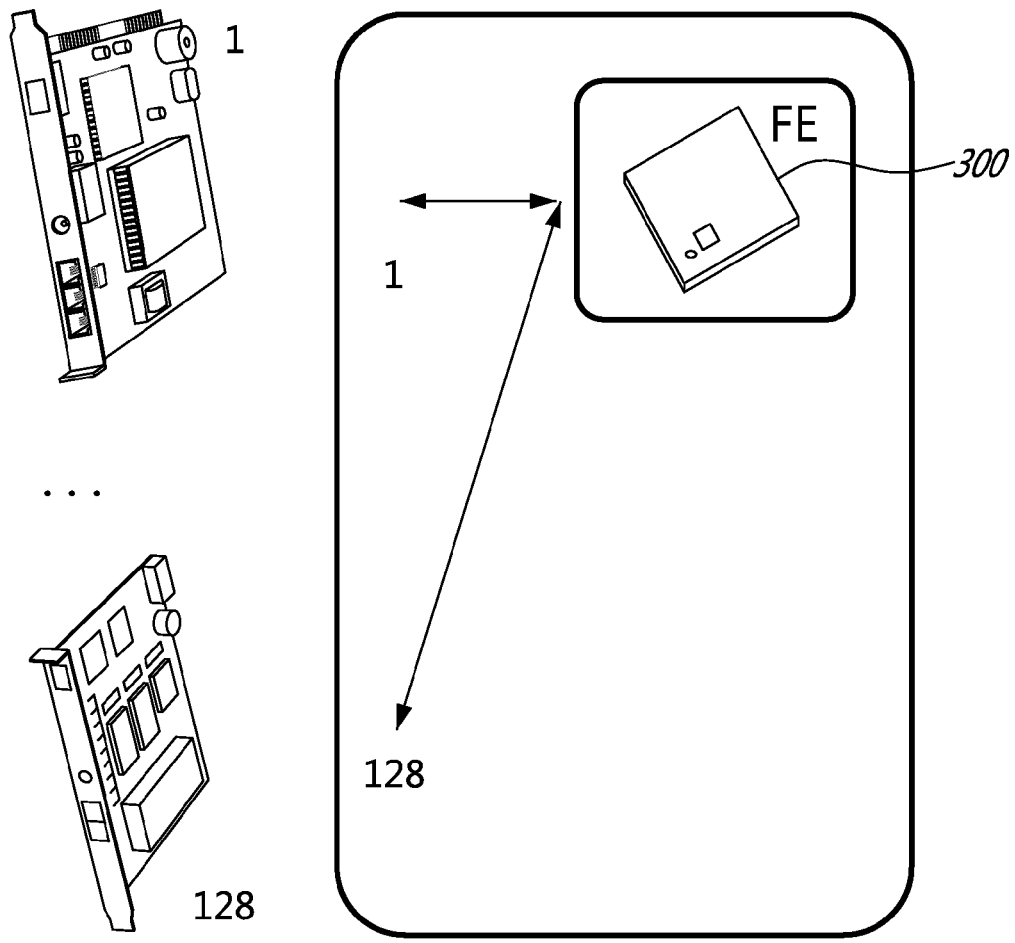
FIG. 3 illustrates a single stage switching architecture.

A switching fabric architecture can have only a single stage with one or more FEs. However, using a single-stage architecture design, a switch fabric is limited by the capacity of the fabric element providing the forwarding functions. This architecture design implies that there is only one stage of forwarding function for exchanging packets between different processor blades. For example, as shown in FIG. 3, and assuming that an FE has 128 ports and that each processor blade has only 1 port, the system scalability would be limited to 128 processor blades. In fact, each port of the FE 300 could be used to connect to only one processor blade, which means that a maximum of 128 processor blades could be interconnected with such a switching configuration. Depending on the system requirements, this limitation might or might not be acceptable.

Alternatively, using a multi-stage switching architecture design, a switch fabric can be scaled beyond the limitations imposed by a single FE device. In such a switching architecture design there are multiple stages of forwarding functionality for exchanging packets between different processor blades.

One type of multi-stage design which has been applied to, e.g., telephone networks, is known as a three-stage CLOS architecture design. As will be appreciated by those skilled in the art, using a CLOS architecture, three stages of forwarding can be provided between any two processor blades, thereby enabling more nodes, or processor blades, to be interconnected. In the three stages, a first switching decision (for a given data packet or frame transmitted from an originating processor blade) is made in the first stage FE, in order to select a second stage FE to which to route the data packet or frame. Similarly, a second switching decision in the second FE is used to select a third stage FE, and a third switching decision switches the data packet the destination processor blade.

Figure 4:
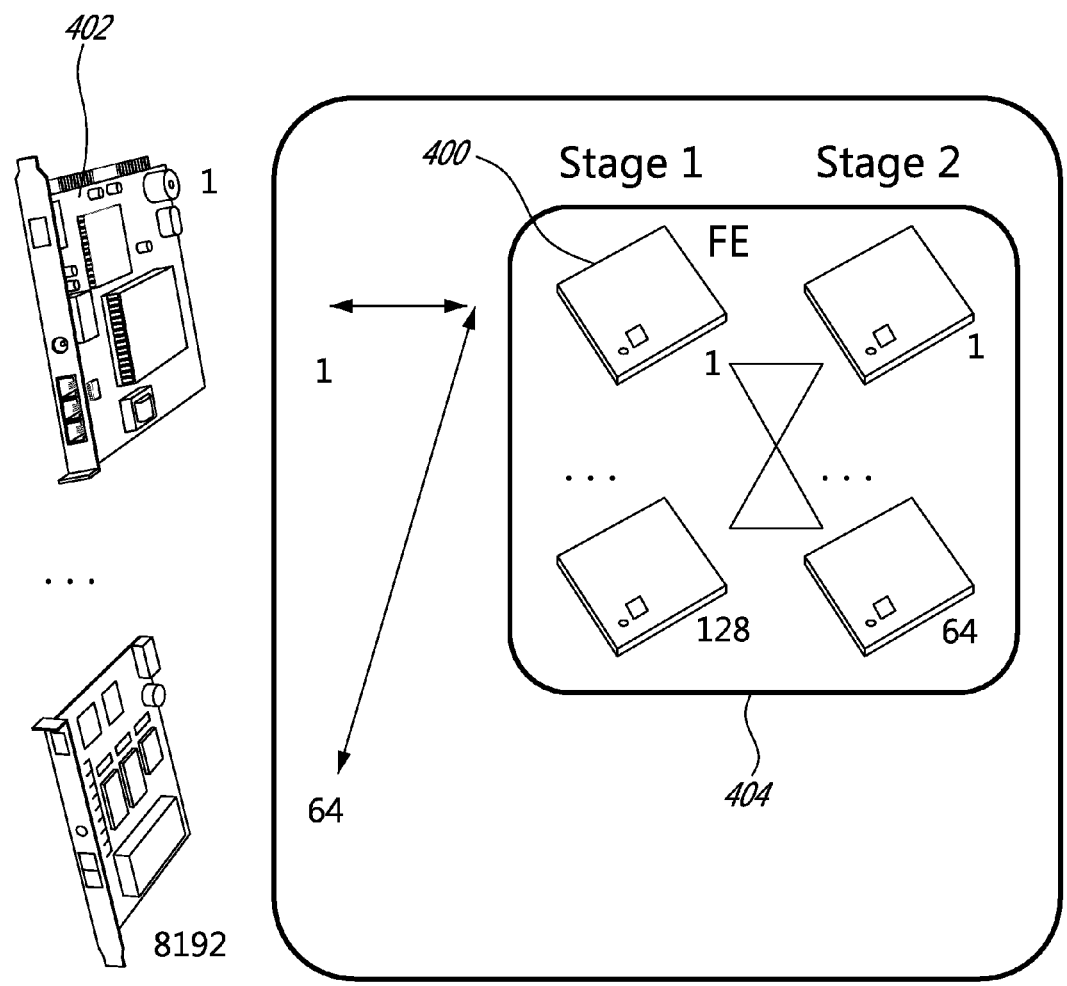
FIG. 4 illustrates a multi-stage switching architecture.

For example, as shown in FIG. 4, and assuming that an FE 400 has 128 ports and that each processor blade 402 has only 1 port, the switching system 404 can scale to enable routing of frames among up to 8192 processor blades. In order to support the maximum number of processor blades in the system, 192 FEs are required. This allows 128 first stage FEs to access 64 processor blades each via 64 second stage FEs, i.e. 128*64=8192 processor blades. In the context of the embodiments described herein, three-stage CLOS architectures are shown as a three-stage "folded" CLOS architecture, i.e., where the third stage FEs are the same as the first stage FEs. Moreover, in a multi-stage architecture design, the number of FEs required on each stage depends on the characteristics expected on the switch fabric. In order to build a non-blocking switch fabric, i.e., where a new connection can be established between any two blades without deconstructing an existing connection, the number of second stage FEs always needs to be at least half the number of first stage FEs.

In addition to single stage and multi-stage architectures, another type of switching architecture is a multi-plane switching architecture. With a multi-plane architecture design, a switch fabric is no longer limited by the scalability offered by a single-stage or a multi-stage architecture design. Assuming that each processor blade has more than one port available towards the switch fabric, each port could be connected to a different plane of the switch fabric. This architecture design allows increasing the bandwidth between a processor blade and a switch fabric without compromising the maximum number of interconnected processor blades.

Figure 5:
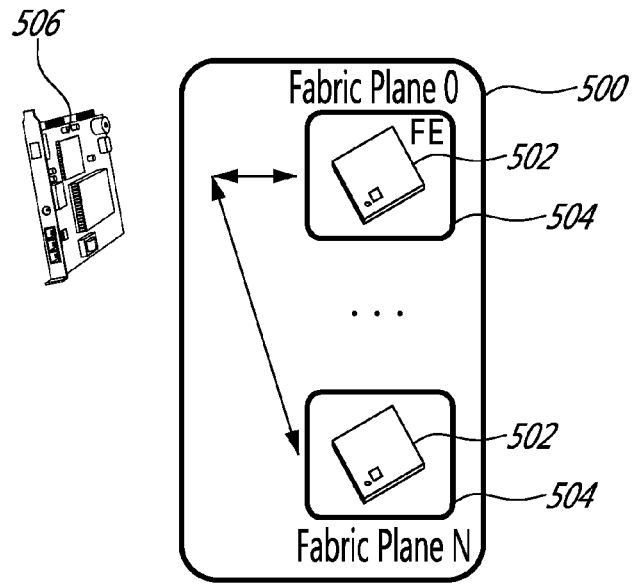
FIG. 5 illustrates a multi-plane switching architecture.

As shown, for example in FIG. 5 with a single-stage/multi-plane switch fabric architecture design, it becomes possible to provide multiple planes of a switch fabric 500 where one FE 502 is available per plane 504. Assuming that a processor blade 506 requires a bandwidth capacity of 100 Gbps with the switch fabric 500, and that each port on the FE 502 is capable of 10 Gbps, then 10 planes 504 of the switch fabric 500 would be required to provide the desired switching bandwidth according to this example, i.e. 10 planes*10 Gbps=100 Gbps bandwidth. This is based on each processor blade 506 being able to use multiple links with the switch fabric, i.e., at least one per plane, in order to send and receive frames via multiple switching planes 504. The multi-plane architecture design illustrated in FIG. 5 can be used for a single-stage architecture, as shown, or a multi-stage architecture design. For example, a multi-stage architecture design would scale the same way as for the one-stage architecture design, i.e., more planes 504 being provided depending on the number of ports available on each processor blade 506.

In a multi-plane architecture design, it is envisioned according to some embodiments that each plane would benefit from being completely independent from each other in terms of switching decisions. Assuming that each plane is independent of other planes in terms of switching decisions, this implies that each frame would traverse a selected plane of the switch fabric, thereby requiring information in order to take the correct switching decision. This information could be contained in the frame itself and/or in the FEs. Even though the planes could benefit from being independent from each other, there might still be advantages to making the planes slightly dependent on each other, in order to help with frame ordering, quality of service and congestion management, for example.

According to exemplary embodiments, the afore-described techniques can be combined in order to generate a scalable switching fabric wherein more or fewer FEs can be added to enable routing among more or fewer processor blades, for example. In the context where a switch fabric is required to scale, it would be advantageous that the switch fabric could be capable not only to support any number of processor blades based on the same architecture design, but also capable of guaranteeing the minimum hardware on a system for the required capacity. For example, more or less processor blades can be installed on a system having a scalable switch in order to provide more or less processing capacity.

Figure 6:
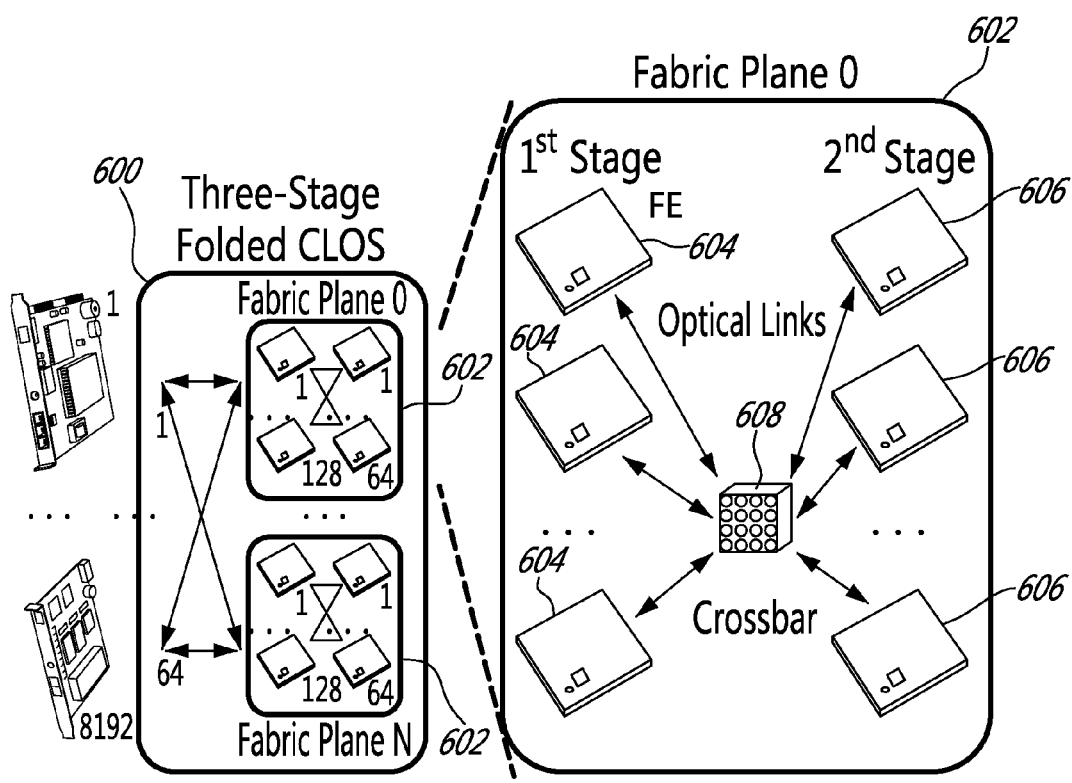
FIG. 6 shows a multi-plane, multi-stage, dynamically scalable switching architecture according to an exemplary embodiment.

FIG. 6 illustrates a multi-stage, multi-plane scalable switching fabric 600 according to an exemplary embodiment. Each plane 602 can include a plurality of first stage FEs 604 interconnected with a plurality of second stage FEs 606 via a crossbar device 608. The crossbar device 608 is a device that enables dynamic reconfiguration of the mapping between the first stage FEs 604 and the second stage FEs 606, as FEs are, for example, added, removed or replaced. Such a crossbar device 608 can electronically or optically interconnect all of the desired output ports of the first stage FEs 604 with all of the desired input ports of the second stage FEs 606. In the example of FIG. 6, the fabric plane 0 is fully populated with FEs, e.g., 128 first stage FEs 604 and 64 second stage FEs 606, such that the electronic or optical crossbar 608 connects all of the output ports of all of the FEs 604 with all of the input ports of all of the FEs 606. However, as described in more detail below, since the switching fabric 600 is scalable, it may be the case that one or more planes are not fully populated with FEs, in which case the crossbar 608 will be configured to interconnect only those FE interfaces which are populated with FEs.

As suggested by the term crossbar, this device 608 does not require any information from the frames transiting through to enable its switching function. The crossbar device 608 can be dynamically reconfigurable and agnostic of the frame payload going through it. As they are currently available on the market, electrical crossbars could be used as the crossbar 608 to provide this reconfigurable FE linkage. On the other hand, optical-based crossbars are envisioned to be much more energy efficient, as well as allowing more bandwidth to reach longer distances in systems, and so according to other exemplary embodiments an optical crossbar can be used as crossbar 608. An example of an optical crossbar which could be used as crossbar 608 is provided in U.S. patent application Ser. No. 12/861,185, filed on Aug. 23, 2010, the disclosure of which is incorporated here by reference. Note too, that although the exemplary embodiment of FIG. 6 depicts a multi-stage, multi-plane architecture, that the present invention is not limited thereto and can also include, for example, a single plane architecture as described below.

Figure 7A:
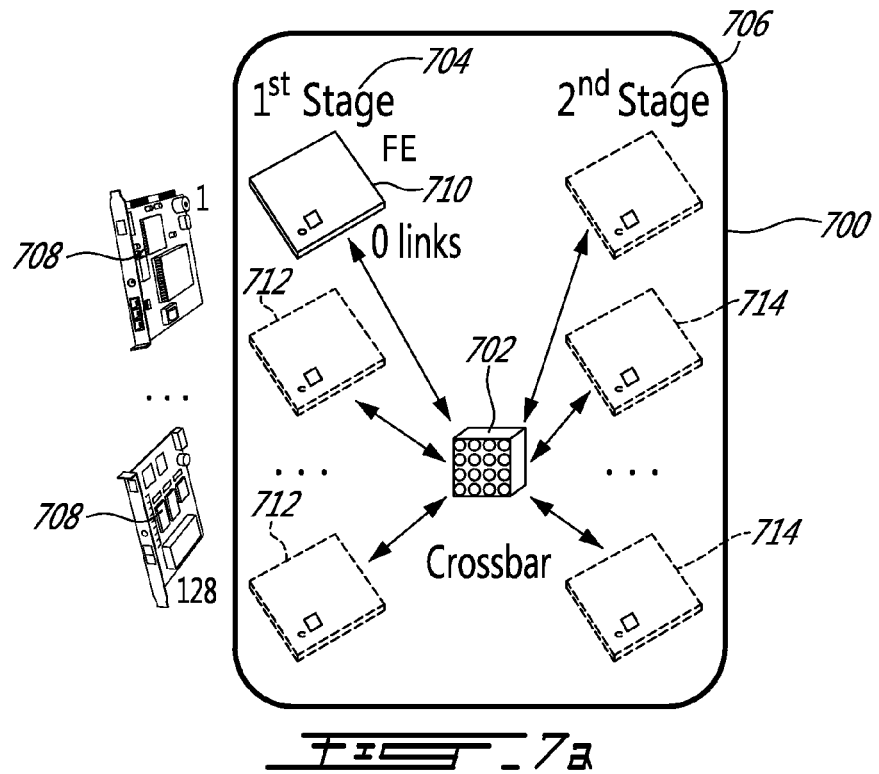
FIGS. 7(a) and 7(b) depict adding fabric elements to a dynamically scalable switch according to an embodiment.
Figure 7B:
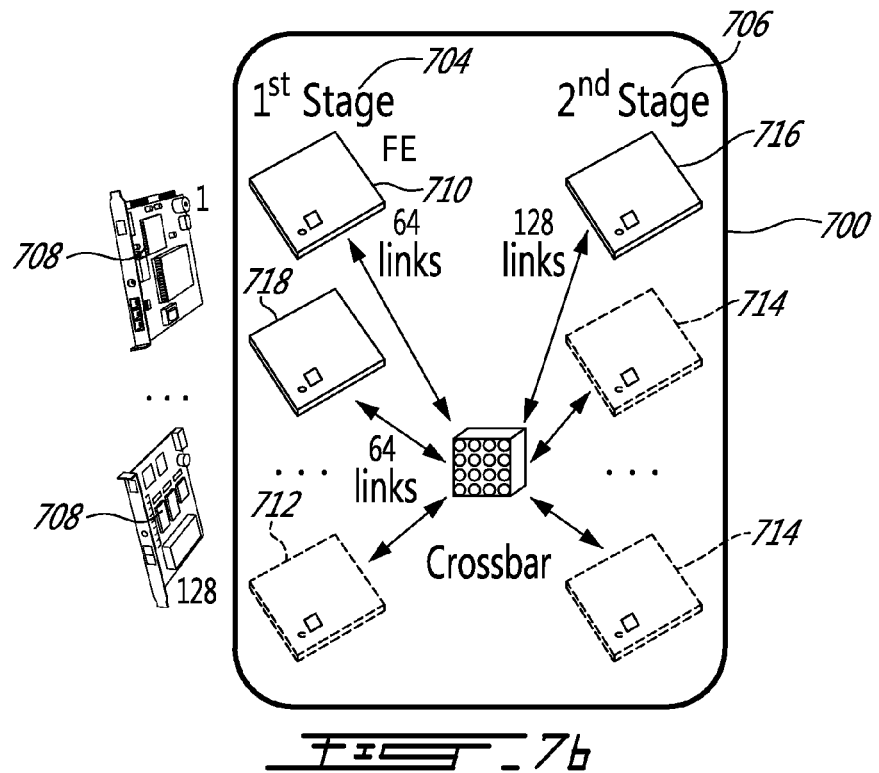

As shown in the scalable switching fabric 700 according to an embodiment illustrated in FIGS. 7(*a*) and 7(*b*), by using such a crossbar device 702, the switch fabric 700 can scale to accommodate varying numbers of FEs and by enabling a dynamic reconfiguration of the interconnect mapping between the first stage FEs 704 and the second stage FEs 706. For example, the scalable switching fabric 700 can include a plurality of first stage interfaces and a plurality of second stage interfaces, each of which may be either populated with an FE or unpopulated. As shown, for example, in FIG. 7(*a*), a system could allow 128 processor blades 708 to be interconnected using a switch fabric with only one FE 710 populated in the first stage 704 of a plane of the switching fabric. Thus, in the example of FIG. 7(*a*), the remaining first stage interfaces 712 and all of the second stage interfaces 714 are unpopulated. The switching fabric configuration shown in FIG. 7(*a*) is a single-stage architecture design, which can be extended to a three-stage CLOS architecture design when required.

For example, as shown in FIG. 7(*b*), the same switching fabric 700 can be extended from a single stage configuration into a three-stage CLOS architecture by adding one FE 716 on the second stage 706 and one more FE 718 on the first stage 704 of the switch fabric 700. The interfaces 712 and 714 represent some of the unpopulated, i.e., currently empty of FEs, interfaces at this point in time for the switching fabric 700. In addition to adding these additional FEs, the switching fabric 700 is further modified by reconfiguring the crossbar 702 so that the 64 links between each first stage FE 710 and 718 can be connected to the second stage FE 716. Note that while FIG. 7(*b*) indicates that each FE is limited to 128 ports, that this exemplary value is shown only to illustrate one embodiment and that, in practice, each FE can support any number of ports.

As more processor blades, for example, are added in a system using a scalable switching fabric according to these embodiments, more FEs can be added to the switching fabric. While supporting more processor blades means adding more first stage FEs, it can also for example mean making sure that the number of second stage FEs is at least half the number of first stage FEs to ensure that the three stage CLOS architecture remains nonblocking. The crossbar device is then used to make the required interconnections between the first stage and the second stage FEs. As shown for example in FIGS. 8(*a*) and 8(*b*), to upgrade a scalable switching fabric 800 according to an embodiment which is currently supporting 128 processor blades 802 in FIG. 8(*a*) to support the 256 processor blades 802 in FIG. 8(*b*), the number of first stage FEs 804 needs to be doubled, as well as the number of second stage FEs 806. Assuming that each FE has 128 ports, in this purely illustrative example, on a first stage FE 804, 64 ports of the first stage FE 804 are connected to 64 processor blades 802, while the other 64 ports are connected towards the second stage FEs 806 via the crossbar 808. Note that there are still unpopulated FE interfaces in the configuration of FIG. 8(*b*) for future expansion of the capabilities of the scalable switch fabric 800.

Figure 8A:
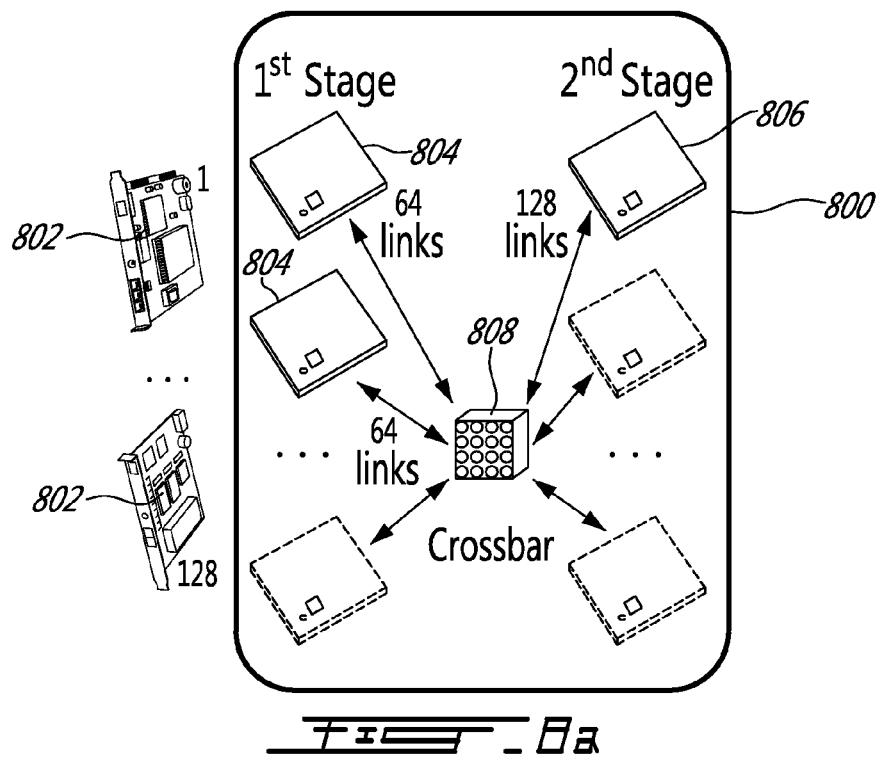
FIGS. 8(a) and 8(b) depict adding fabric elements to a dynamically scalable switch according to another embodiment.
Figure 8B:
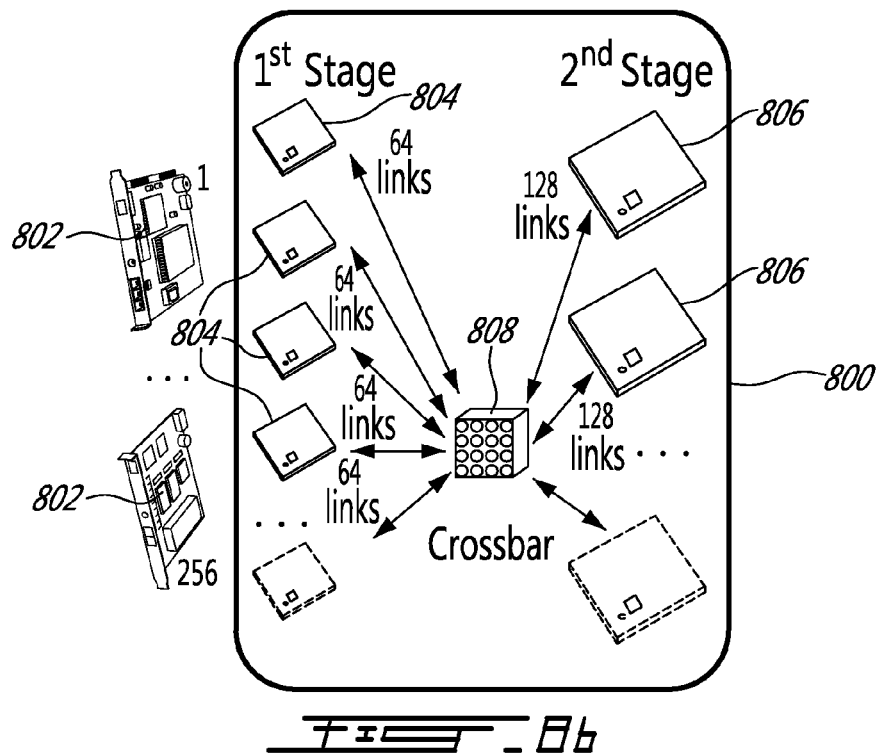

As described above, in order to provide a non-blocking characteristic in the switch fabric, the number of FEs on the first stage and the second stage can be increased by doubling the number of existing FEs available on each stage according to an embodiment. This means that the minimum upgrade of a 128-blade system, as shown in FIG. 8(*a*), would be to a 256-blade system as shown in FIG. 8(*b*). However it should be noted that providing a completely nonblocking characteristic to switching fabrics is not required for all embodiments, e.g., a partially nonblocking characteristic could be provided instead. Assuming that an FE has 128 ports, each switch fabric plane could be scaled according to the configurations shown in the Table below, which configurations can be used to provide a non-blocking switch fabric architecture design according to various embodiments.

| Number of Processor Blade | Number of $1^{st}$ Stage FEs | Number of $2^{nd}$ Stage FEs |
|---|---|---|
| 128 | 1 | 0 |
| 128 | 2 | 1 |
| 256 | 4 | 2 |
| 512 | 8 | 4 |
| 1024 | 16 | 8 |
| 2048 | 32 | 16 |
| 4096 | 64 | 32 |
| 8192 | 128 | 64 |

Thus, according to exemplary embodiments, first stage and second stage FEs provide a way to dynamically change the interconnect topology of a scalable switch fabric each time that the switch fabric needs to support more or fewer processor blades. Each second stage FE has connections with every first stage FE, and the crossbar device is used to dynamically reconfigure the interconnect mapping between the FEs in order to provide a valid three-stage CLOS architecture design. Assuming, as an illustrative example, that each FE has 128 ports, on a first stage FE 64 ports would be connected to 64 processor blades, while the other 64 ports would be connected towards the second stage FEs. In order for the three-stage CLOS architecture to work in a non-blocking manner, each first stage FE has its 64 ports evenly distributed between all of the second stage FEs. However another type of distribution could be used to obtain other switching behaviors.

As shown in FIG. 9, each first stage FE 900 evenly distributes its ports towards the second stage FEs 902 via crossbar 904 in order to guarantee a non-blocking switch fabric 906. In this example, since there are two, second stage FEs 902, each first stage FE 900 has 32 ports connected to each second stage FE 902. While each of the first stage and second stage FEs is physically connected to a centralized crossbar device 904, the crossbar device 904 logically makes the required interconnections between the FEs 900, 902 based on the latest crossbar device configuration. A controller 908 can be included in, or connected to, the switch fabric 906 to reconfigure the crossbar 904 to establish a new set of links between first stage and second stage FEs when one or more FEs are added to, or removed from, the first stage and second stage. The manner in which the reconfiguration is performed will depend upon the type of crossbar technology which is used, e.g., in an optical crossbar such as the one described in the above-incorporated by reference patent application, one or more micro-ring resonators can be retuned to redirect different optical wavelengths along different optical waveguides in order to reconfigure the device. FIG. 9 also shows some empty interfaces 910 to illustrate the scalability of the switch 906, as described above. Each stage can be scaled upwardly by doubling the number of FEs which populate the provided interfaces, e.g., 1, 2, 4, 8, 16, 32, 64, 128, etc.

Depending on the switch fabric architecture design selected for a given embodiment, different strategies for enabling scalability requirements might be chosen. For example, in the case where a highly-scalable switch fabric is envisioned to be based on a multi-plane, multi-stage approach, it becomes possible to identify a few strategic approaches to provide scalability characteristics. As mentioned before, the concept of using multiple planes of switch fabric allows each processor blade to split their bandwidth requirement towards the switch fabric between several planes. This means that a system could allow new processor blades with higher processing and bandwidth capacities to be added to the system by adding more planes to the switch fabric. On the other hand, as more or fewer processor blades are required, first stage and second stage FEs can be added or removed. As FEs are added or removed on a plane of a switch fabric according to an embodiment, the crossbar device dynamically reconfigures the interconnect topology between the FEs, according to (for example) the parameters associated with a non-blocking, three-stage CLOS architecture design.

As each plane might need to be modified physically to add, remove or replace FEs, it is envisioned that one plane of a multi-plane switching fabric according to these embodiments could be upgraded at a time. By taking one plane out of service at a time, this implies a graceful degradation of service of the total bandwidth normally available to each processor blade for exchanging packets. For example, in the case of a planned reconfiguration, each processor blade could be made aware of the upgrade of a particular plane, which would force each processor blade to temporarily redirect the traffic through other planes. Assuming that each processor blade would have a 100 Gbps bandwidth split over ten 10 Gbps links connected to ten planes, taking one plane out of service would leave nine available ports, i.e. 90 Gbps of bandwidth instead of 100 Gbps. This maintenance procedure could then be performed for every plane individually or in groups.

Assuming that a planned reconfiguration of the FEs on each plane is required, it is assumed that such a maintenance operation would normally be performed during periods where the traffic is relatively low. In such cases, a graceful degradation of service of the total bandwidth available normally on the switch fabric could be completely transparent to live traffic. However, in cases where, for example, at least 100 Gbps would have to be always provided as a minimum switching bandwidth, more planes could be provided, as long as each processor blade has at least eleven ports at 10 Gbps for providing a minimum of 100 Gbps of total bandwidth for this illustrative example.

The foregoing exemplary embodiments of a dynamically scalable switching fabric, and related systems, devices and methods, provide for a number of potential advantages and benefits. For example, the usage of a multi-stages architecture design, e.g., a three-stage CLOS architecture, allows for a highly scalable approach in order to scale the maximum number of interconnected nodes, or processor blades, from a very small to a very large number. The concept of the multi-planes architecture design allows for a highly scalable approach in order to scale the maximum bandwidth capacity of a node, or processor blade, towards the switch fabric. By combining the concepts of multi-stages and multi-planes architecture designs, it is possible to envision a very flexible approach for scaling a switch fabric in terms of the maximum number of nodes and the maximum bandwidth capacity for each of them. As systems might be required to handle very small or very large amounts of traffic, there are advantages to providing a scalable solution that minimizes the required hardware according to the requirements. In the context of a switch fabric, it is envisioned that allowing FEs to be added or removed dynamically based on the system's capacity requirements will be advantageous.

As more or fewer FEs can thus be added to or removed from the switch fabric dynamically, it is envisioned that a crossbar device will make the required interconnections between the FEs as required by the configuration. By using a crossbar to interconnect the FEs, the interconnect topologies of the links between the different FEs can be dynamically changed. It is envisioned that an optical crossbar could be used to interconnect the FEs on the switch fabric. By optically interconnecting the FEs, the solution would be more energy efficient, possibly independent of the bit-rate, and would allow for longer distance between the FEs. Each time the configuration of a switch fabric needs to be changed, for example to support more processor blades, it is possible to inform each processor blade of the planned reconfiguration on a plane-basis. In such a case, it becomes possible to upgrade one plane at a time, assuring the possibility for avoiding losing packets during the maintenance operation.

Moreover, the type of flexibility provided by switch fabric architectures according to these embodiments enables more ways to accommodate system expansions in the future. For example, it is envisioned that an FE could be upgraded with a next generation FE, e.g., one plane at a time, thereby making the upgrade possible while continuing operation of the switch.

Figure 10:
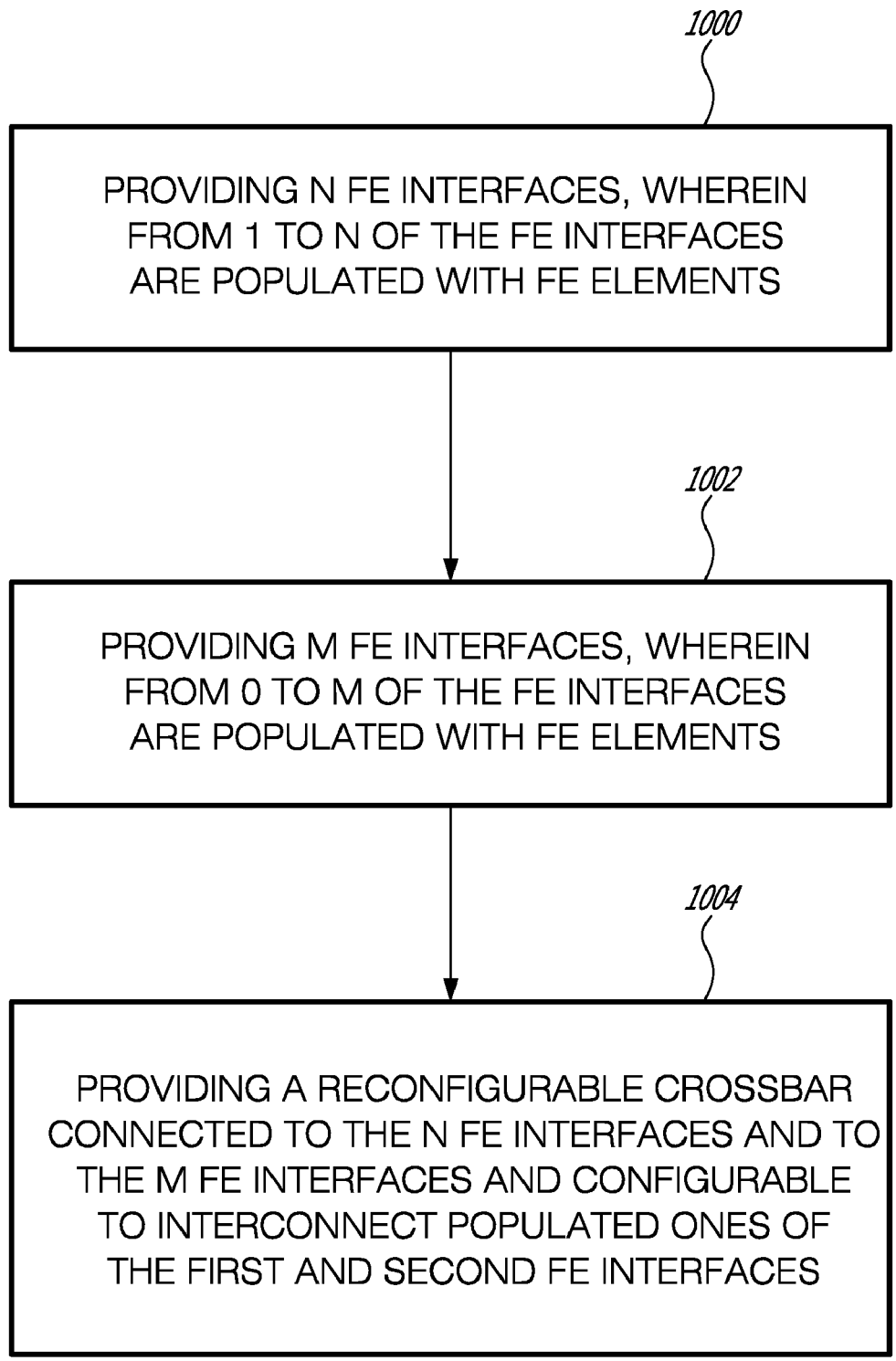
FIG. 10 is a flowchart illustrating a method for manufacturing a dynamically scalable switch according to embodiments.

Exemplary embodiments also contemplate methods for manufacturing dynamic, scalable switches. Such methods include the provisions of interfaces or sockets into which FE elements can be connected to scale the switch as described above. As shown in FIG. 10, a method for manufacturing a dynamically scalable switching fabric can include the steps of providing (step 1000) N first switch fabric element (FE) interfaces, each of which is configured to be able to receive a first FE in a manner which enables the first FE to route data packets from a first input port of the first FE to a first output port of the FE, wherein from 1 to N of the N first switch fabric element interfaces are populated with a respective first FE. Additionally, M second switch FE interfaces are provided, at step 1002, each of which is configured to receive a second FE in a manner which enables the second FE to route data packets from a second input port of the second FE to a second output port of the second FE, wherein from zero to M of the M second FE interfaces are populated with a respective second FE. A reconfigurable crossbar element is provided at step 1004, which is connected to the plurality of N first switch FE interfaces and to the plurality of M second switch FEs, and which reconfigurable crossbar element is configurable to interconnect populated first and second FE interfaces.

The above-described exemplary embodiments are intended to be illustrative in all respects, rather than restrictive, of the present invention. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

What is claimed is:

1. A dynamically scalable switching fabric comprising:
N first switch fabric element (FE) interfaces, each of which is configured to receive a first FE in a manner which enables said first FE to route data packets from a first input port of the first FE to a first output port of the first FE,
wherein from 1 to N of said N first switch fabric element interfaces are populated with a respective first FE;
M second switch FE interfaces, each of which is configured to receive a second FE in a manner which enables said second FE to route data packets from a second input port of the second FE to a second output port of the second FE,
wherein from zero to M of said M second FE interfaces are populated with a respective second FE; and
a reconfigurable crossbar element, connected to said N first switch FE interfaces and to said M second switch FE interfaces, which reconfigurable crossbar element is configurable to interconnect populated first and second FE interfaces.

2. The dynamically scalable switching fabric of claim 1, wherein said reconfigurable crossbar element is an electrical crossbar.

3. The dynamically scalable switching fabric of claim 1, wherein said reconfigurable crossbar element is an optical crossbar.

4. The dynamically scalable switching fabric of claim 1, wherein said N first switch fabric element (FE) interfaces, said M second switch FE interfaces, and said reconfigurable crossbar element are all disposed on a first plane of said dynamically scalable switching fabric and wherein said dynamically scalable switching fabric further comprises:
a second plane including another N first switch FE interfaces, another M second switch FE interfaces, and another reconfigurable crossbar element.

5. The dynamically scalable switching fabric of claim 4, wherein each of said first plane and said second plane are independently removable from said dynamically scalable switching fabric.

6. The dynamically scalable switching fabric of claim 1, wherein a first number of said N switch FE interfaces are populated with FEs and a second number of said M switch FE interfaces are populated with FEs, and
wherein said reconfigurable crossbar element is configured to interconnect said first number of FEs with said second number of FEs to operate as a folded three-stage CLOS switching architecture.

7. The dynamically scalable switching fabric of claim 6, wherein said first number is twice said second number.

8. The dynamically scalable switching fabric of claim 1, further comprising:
a controller, connected to the reconfigurable crossbar element, configured to modify interconnection configurations between populated ones of said N first switch FE interfaces and populated ones of said M switch FE interfaces.

9. A method for manufacturing a dynamically scalable switching fabric, the method comprising:
providing N first switch fabric element (FE) interfaces, each of which is configured to receive a first FE in a manner which enables said first FE to route data packets from a first input port of the first FE to a first output port of the first FE,
wherein from 1 to N of said N first switch fabric element interfaces are populated with a respective first FE;
providing M second switch FE interfaces, each of which is configured to receive a second FE in a manner which enables said second FE to route data packets from a second input port of the second FE to a second output port of the second FE,
wherein from zero to M of said M second FE interfaces are populated with a respective second FE; and
providing a reconfigurable crossbar element, connected to said N first switch FE interfaces and to said M second switch FEs, which reconfigurable crossbar element is configurable to interconnect populated first and second FE interfaces.

10. The method of claim 9, wherein said reconfigurable crossbar element is an electrical crossbar.

11. The method of claim 9, wherein said reconfigurable crossbar element is an optical crossbar.

12. The method of claim 9, wherein said N first switch fabric element (FE) interfaces, said M second switch FE interfaces, and said reconfigurable crossbar element are all disposed on a first plane of said dynamically scalable switching fabric and wherein said method further comprises:
providing a second plane including another N first switch FE interfaces, another M second switch FE interfaces, and a reconfigurable crossbar element.

13. The method of claim 12, wherein each of said first plane and said second plane are independently removable from said dynamically scalable switching fabric.

14. The method of claim 9, wherein a first number of said N switch FE interfaces are populated with FEs and a second number of said M switch FE interfaces are populated with FEs, and
wherein said reconfigurable crossbar element is configured to interconnect said first number of FEs with said second number of FEs to operate as a folded three-stage CLOS switching architecture.

15. The method of claim 14, wherein said first number is twice said second number.

16. The method of claim 9, further comprising:
providing a controller, connected to the reconfigurable crossbar element, configured to modify interconnection configurations between populated ones of said N first switch FE interfaces and populated ones of said M switch FE interfaces.

17. A dynamically scalable processing system comprising:
a plurality of blade processors;
a switch having:
N first switch fabric element (FE) interfaces, each of which is configured to receive a first FE in a manner which enables said first FE to route data packets from a first input port of the first FE to a first output port of the first FE, wherein from 1 to N of said N first switch fabric element interfaces are populated with a respective first FE;
M second switch FE interfaces, each of which is configured to receive a second FE in a manner which enables said second FE to route data packets from a second input port of the second FE to a second output port of the second FE, wherein from zero to M of said M second FE interfaces are populated with a respective second FE; and
a reconfigurable crossbar element, connected to said N first switch FE interfaces and to said M second switch FEs, which reconfigurable crossbar element is configurable to interconnect populated first and second FE interfaces under control of a controller connected to the reconfigurable crossbar element,
wherein said processor blades are each connected to each of said populated first FE interfaces.

* * * * *